UNITED STATES PATENT OFFICE.

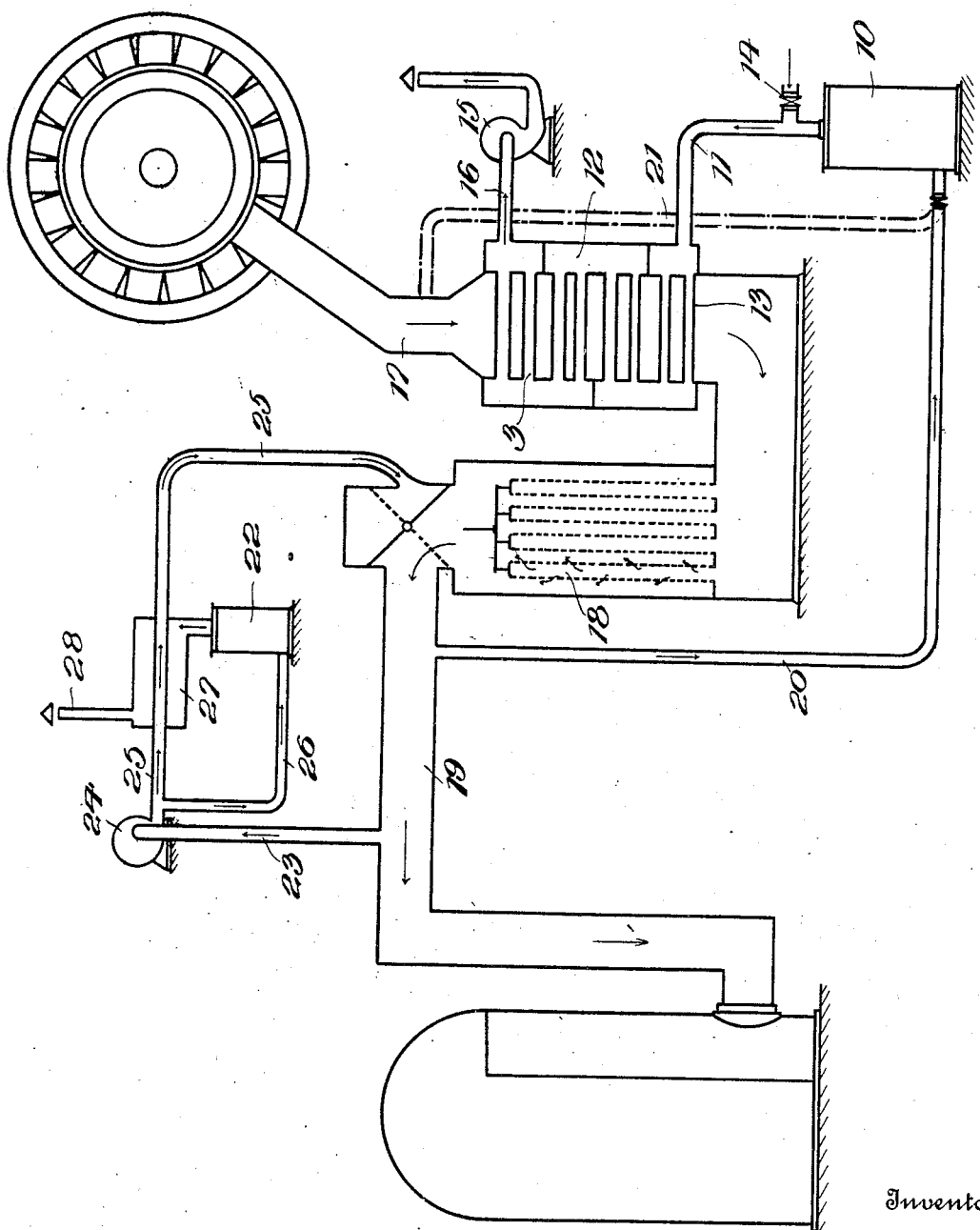

OTTO OESTERLEN, OF ZWEIBRÜCKEN, GERMANY.

PROCESS OF PREHEATING BLAST-FURNACE GASES.

1,219,852.

Specification of Letters Patent. Patented Mar. 20, 1917.

Application filed April 1, 1915. Serial No. 18,630.

*To all whom it may concern:*

Be it known that I, OTTO OESTERLEN, a subject of the King of Bavaria, residing at Schiller street No. 6, Zweibrücken, Bavaria, Germany, have invented certain new and useful Improvements in Processes of Preheating Blast-Furnace Gases, of which the following is a specification, reference being had therein to the accompanying drawing.

The invention relates to improvements in processes of preheating blast-furnace gases in conjunction with dry-cleaning plants.

When blast-furnace gases are to be treated in dry-cleaning plants, it is necessary to preheat the gas when its temperature is low. Up to the present time steam preheaters working with waste heat were used.

Frequently the blast stoves are located far away from the cleaning plant and it is sometimes not possible to bring the waste heat to the cleaning plant. Long mains reduce the heating capacities of the waste heat considerably by cooling down and further as the initial heat of the waste heat is getting lower when using clean gas in blast stoves it is advisable to use instead of waste heat burnt gases obtained by burning a small part of the crude or clean gas, the temperatures of the burnt gases being regulated by adding later on air or other non-combustible gases. These burnt gases, produced in special ovens can be drawn by fans through the preheaters for the crude gas and the filtered back-cleaning gas. This disposition makes the whole process independent of the working of the blast-stoves and makes it possible to obtain quickly very high burnt gas temperatures and therefore sufficient overheating of the crude gas, should it have especially low temperatures.

It is also possible to work the apparatus regulating the gas-temperatures within the plant and it is not necessary to communicate for that purpose with the men on the blast stoves. The preheaters can be made smaller, the temperatures of the active medium being far higher than when using the waste gases of the blast stoves. The consumption of power for the transporting fan is also lower than before, it being not necessary to act against the chimney draft.

Compared with steam these preheaters are more economical, the new process being direct, without first transforming heat into steam, thereby saving losses and as formerly said the preheaters can be kept smaller on account of the high initial heat contained in the burnt gases.

It may be advantageous in certain cases to install two ovens, one for the crude gas and a smaller one for the back gas instead of one for both. Sometimes it will be possible to throttle down or shut off completely the oven heating the crude gas when the temperature of the crude gas is sufficiently high. It is then possible to always bring the back gas to the required temperature, independently from the temperature of the crude gas. This is a rather important point, experience having proved it necessary to keep it at the same or even higher temperature than the crude gas, so as to counterbalance the cooling effect, which is rather greater than for the crude gas before entering the filter plant.

The invention resides in the certain new and useful process, aforementioned, and the same may be carried out to the desired degree of efficiency by an apparatus, such as is illustrated in the accompanying drawing, in which:—

The figure shown is a diagrammatical view of a preferred arrangement of the several devices, and their connections, forming the apparatus.

Referring to the drawing, the numeral —10— designates a furnace having connection, through the medium of a pipe —11—, with a heater-jacket —12—, surrounding a superheater —13—. An air intake —14— is arranged in the pipe —11—, so that a suitable amount of air may be admixed with the burnt gases, which are to be drawn from the furnace —10—, through the heater-jacket —12—, and discharged to atmosphere, under the action of a suction-fan —15—, which is connected to the heater-jacket by means of a pipe —16—.

Crude gas, to be treated, is admitted through an inlet —17—, having connection with a source of crude gas supply, such as blast furnaces, hot-blast stoves, gas engines, or the like, (not shown), located in the top of the preheater —13—, and passes through the latter and discharges from the bottom thereof into a gas-filter —18—, which terminates, at its upper end, in a conveying conduit —19— leading to the point of its ultimate utilization. A pipe —20— leads from the conduit —19— and connects with the furnace —10—, for the purpose of supplying the latter with a desired amount of filtered, preheated gas for the proper operation of the apparatus.

It may, however, be desired to utilize crude gas for combustion in the furnace —10—, either alone, or in conjunction with the filtered, preheated gas, aforesaid, and for the purpose of supplying the latter with a suitable amount of the same, a pipe —21— connects the lower end of the furnace with the upper or inlet end of the preheater, as shown.

Supplemental to the foregoing apparatus, which is sufficient for properly heating the crude gas when the temperature of the latter is lower than is desired, there may be provided a second furnace —22—, smaller in size with respect to that of the furnace —10—, for the treatment of the back gas. This latter furnace operates as follows: A pipe —23— is connected, at one end, to the conduit —19—, and at its other end to a suction-fan —24—, which, in turn, is connected to the upper end of the gas-filter —18—, by means of a pipe —25—. A branch-pipe —26— leads from the pipe —25— to the furnace —22—, and conveys purified gas thereto as the latter is drawn from the conduit —19—, by the action of the suction-fan —24—. The furnace —20— is connected to a heater-jacket —27—, surrounding the pipe —25—, and the burnt gases passing therethrough are discharged to atmosphere through an outlet-pipe —28—.

It is obvious that various arrangements of the several devices, forming this apparatus, and other similar types of the former, may be resorted to and utilized for the desired purpose, without departing from the spirit of the invention.

I claim:

1. The process of preheating the waste gases from blast furnaces for utilization in hot blast ovens, which consists in burning a portion of such waste gases and passing the products of combustion through a preheater through which the main volume of waste gases are passed.

2. The process of preheating the waste gases from blast furnaces for utilization in hot blast ovens, which consists in filtering the waste gases, burning a portion of such waste gases, before or after filtering, or both, and passing the products of combustion through preheaters through which the main volume of waste gases, filtered or unfiltered, are conducted.

In testimony whereof I affix my signature in the presence of two witnesses.

OTTO OESTERLEN.

Witnesses:
   Friedrich Stein,
   Hermann Saterdag.